United States Patent [19]
Veglia

[11] 3,801,172
[45] Apr. 2, 1974

[54] SPACER CAGE FOR ROLLING BEARINGS
[75] Inventor: Bartolo Veglia, Torino, Italy
[73] Assignee: Riv-Skf Officine Di Villar Perosa S.p.A., Torino, Italy
[22] Filed: Oct. 17, 1972
[21] Appl. No.: 298,329

[30] Foreign Application Priority Data
Nov. 24, 1971 Italy.................................. 70847/71

[52] U.S. Cl. .............................................. 308/217
[51] Int. Cl. ............................................ F16c 33/46
[58] Field of Search............................ 308/217, 218

[56] References Cited
UNITED STATES PATENTS
3,626,565 12/1971 Koch................................... 308/217

Primary Examiner—Manuel A. Antonakas
Assistant Examiner—Frank Susko
Attorney, Agent, or Firm—Ladas, Parry, Von Gehr, Goldsmith & Deschamps

[57] ABSTRACT

A spacer cage for rolling bearings is described. The main feature of this spacer cage is that of having deformable projecting portions, arranged for arresting each of the rolling bodies in a first position, which permit to assemble in a most simple and rapid manner one race of the bearing on the remaining part of the same, and seats for holding the same rolling bodies in a second position, which permit to separate from the races of the bearing the assembly constituted by the cage and the rolling bodies, in order to permit to inspection the rolling tracks of said races. The passage from the first to the second position takes place by applying a radial force of a predetermined value to each rolling body.

11 Claims, 10 Drawing Figures

SPACER CAGE FOR ROLLING BEARINGS

CROSS-REFERENCE TO RELATED APPLICATION

Applicant claims priority from corresponding Italian Pat. application Ser. No. 70847/71 filed Nov. 24, 1971.

BACKGROUND OF THE INVENTION

This invention relates to a spacer cage or retainer of simple construction for rolling bearings, which permits to assemble in a most simple and rapid manner one race of the bearing on the remaining part of the same, as well as to separate from the races of the bearing the assembly constituted by the cage and the rolling bodies, in order to permit to inspection the rolling tracks of said races.

As is well known, rolling bearings comprise a pair of races in which provision is made for rolling tracks for rolling bodies disposed therebetween and held spaced from one another by a cage or retainer of annular shape. This cage is provided with sockets or seats in which the rolling bodies are housed with a certain clearance or play, so as to allow rolling thereof on the tracks of the races of the bearings.

In some kinds of bearings, such as for instance the roller bearings, one race is separable from the remainder of the bearing, in order to make easier the assembling and disassembling of the components of the mechanical assembly of which the bearings forms part. In fact, in such instance, the two races can be separately secured to two different parts of the assembly, which are subsequently assembled together. In order to separate one race from the other, one of the two races of the aforementioned bearings is not provided with side shoulders for the rolling bodies, whilst the other is normally provided with such shoulders which prevent the assembly, constituted by the cage and the rollers, from being separated from the latter race.

The aforementioned cage, besides providing the spacing action for the rolling bodies as set forth above, will also — in the case of bearings wherein one race is separated from the remainder of the bearing — provide a further action consisting in preventing falling down of the rolling bodies when the race in question is separated from the remaining part of the bearing, by holding said bodies in a position in which the distance between the same and the track is not yet such as to prevent assembling of the bearing. This further action is obtained by shaping the side surface of each socket for the rolling bodies in such a manner as to give rise to a stop for the corresponding body when the latter, no longer constrained by the rolling track of the race which has been removed, becomes radially displaced outwardly or inwardly from its theoretical position in the assembled bearing. According to another constructional arrangement, the same action is obtained by providing, in the periphery of the cage, a number of projections or tabs which act as an arrest against said movement of the rolling bodies.

The spacer cages of the kind referred to, when mounted on bearings one race of which is provided with side shoulders for the rolling bodies, suffer from the drawback due to the fact that they are not separable from said race and, therefore, will not allow any inspection of the track of the race, by maintaining the rollers housed in the corresponding seats or housings (in order to avoid said rollers from falling down, from becoming damaged or also mixed with other rollers of different selection). This requirement is particularly felt in some kinds of bearings, for instance for aeronautical uses, whose tracks must be periodically inspected.

SUMMARY OF THE INVENTION

The object of the present invention is to provide a spacer cage of simple and inexpensive construction for a rolling bearing, which enables to avoid the disadvantages enumerated above.

According to the present invention it is provided a spacer cage of annular shape for a rolling bearing, which has an inner and an outer race between which a crown of rolling bodies is disposed, these bodies being spaced apart by said cage, on both sides of at least one of said races a shoulder for said bodies being provided, comprising:

a number of housings for said bodies, separated by means of crosspieces;

means which arrest in one first position each rolling body when this is radially displaced outwardly or inwardly under the action of its own weight, and which hold in a second position each of said bodies when the body is radially displaced outwardly or inwardly, from the position occupied by the same between said races, by a quantity at least equal to the radial height of said shoulders;

the passage from the first to the second position taking place by applying a radial force of a predetermined value to each rolling body.

BRIEF DESCRIPTION OF THE DRAWINGS

For a better understanding of the present invention, one particular embodiment thereof will now be described, merely by way of non-limiting example, with reference to the accompanying drawings, wherein.

DETAILED DESCRIPTION OF THE INVENTION

Figure 1:
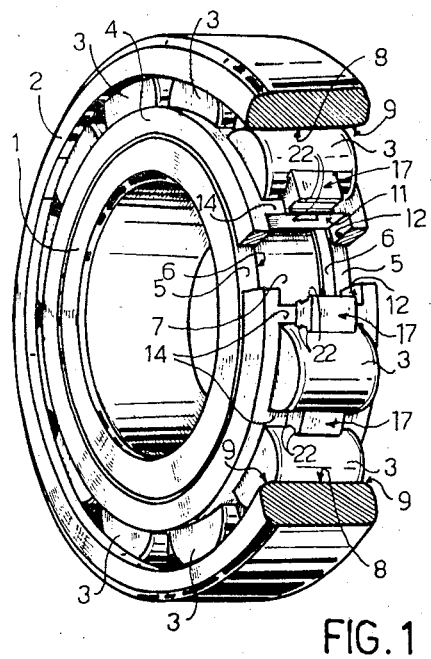
FIG. 1 shows a perspective view, with some parts broken away, of a roller bearing provided with the spacer cage of the invention.
Figure 4:
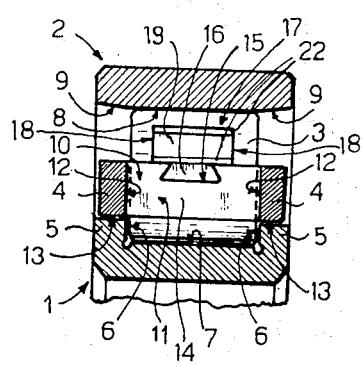
FIG. 4 shows a section of the part of the bearing of FIG. 3, taken along the lines IV—IV.
Figure 5:
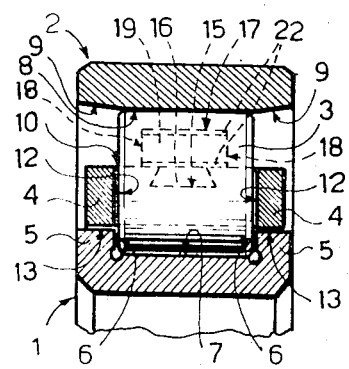
FIG. 5 shows a section of the part of the bearing of FIG. 3, taken along the lines V—V.

Even though the spacer cage of the invention can be utilized on rolling bearings of different kind, in the embodiment herein described and illustrated, it has been mounted on a roller bearing. This bearing comprises an inner and an outer race, 1 and 2 respectively (FIG. 1) and a crown of rollers 3, which are suitably held spaced apart by a cage 4. The bearing shown is of the kind comprising an inner race 1 with annular projections 5 (FIG. 4) in order to form shoulders 6 for the rollers 3, which roll on tracks 7 and 8 of the inner and outer race, 1 and 2 respectively. Preferably, the track 8 is situated between two chamfers 9 of the outer ring 2.

Figure 2:
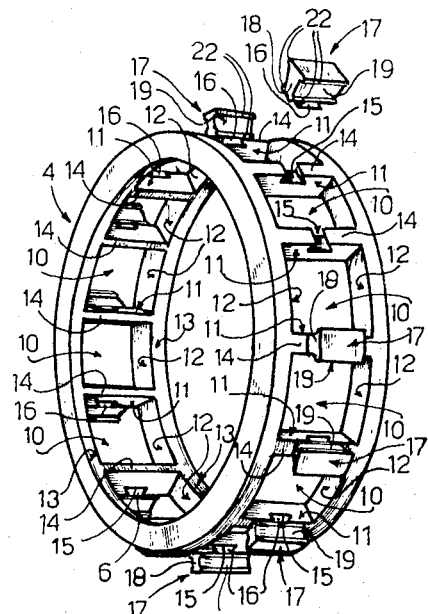
FIG. 2 shows a perspective view, with parts broken away and removed, of the spacer cage of the invention.

The spacer cage 4 (FIG. 2) substantially has the shape of a ring provided with housings 10 for the rollers 3. The cage illustrated is of the socalled massive type, being it obtained from a semifinished product of suitable shape, by means of mechanical operations with chip removal. Obviously, the bearing of the invention can also have a cage with a shape different from that shown.

Each housing 10 is substantially delimited by two pairs of plane and parallel surfaces 11 and 12 (FIGS. 2 and 3), so as to define a seat for each roller 3. Between the surfaces 11 and the cylindrical side surface of each roller 3 a certain clearance is left, in order to allow rolling of the rollers between the tracks 7 and 8 of the races of the bearing. Preferably, the diameter of the inner surface 13 (FIG. 4) of the cage 4 is slightly greater than the outer diameter of the annular projections 5, so that the former can be guided by the latter.

Figure 6:
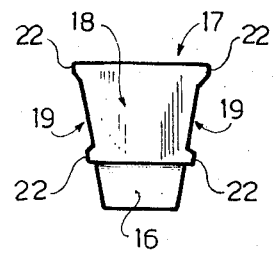
FIGS. 6 and 7 show two side views of a member utilized in the spacer cage according to the invention.
Figure 7:
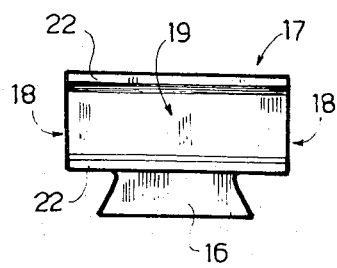

The housings 10 are separated by crosspieces 14 (FIGS. 2 and 3), on each of which a groove 15 substantially of dovetail shape is provided (FIGS. 2 and 4); in this groove there is inserted an appendage 16, of corresponding shape, of a member 17. This is substantially defined by two pairs of surfaces, i.e., front surfaces 18 and side surfaces 19 (FIGS. 2, 3, 6 and 7); those of the first pair are flat and parallel, whereas those of the second pair — in the case of the embodiment illustrated in the drawings — are flat and at an angle substantially equal to the angle formed by the side surfaces 11 (FIG. 3) which laterally delimit the corresponding crosspiece. At the end of each surface 19 a protruding part or projection 22 (FIGS. 6 and 7) is provided; each pair of said projections defines, with the corresponding associated surface 19, one seat for a roller 3, as will be explained more clearly below.

Each member 17 is secured to the cage 4 by inserting its appendage 16 inside the dovetail-shaped groove 15 of the corresponding crosspiece 14. It is evident that the fastening of each memeber 17 to its corresponding crosspiece 14 can be accomplished in any other suitable manner, for instance by inserting an appendage thereof, of a shape different from that illustrated herein, in a corresponding seat of the crosspiece associated therewith.

The members 17 can be delimited by side surfaces of a shape different from that of the surfaces 19 described above. In particular, this shape can be selected so as to create, in correspondence with each end of said surface, a projecting portion of the kind of projection 22, as is the case when said surface is cylindrical.

Even though the members 17 can be constructed with any material and by any processing method, they are preferably made of synthetic material, for instance a thermoplastic material, and suitably obtained by injection moulding.

The behaviour of the cage of the invention during use is as follows.

Figure 3:
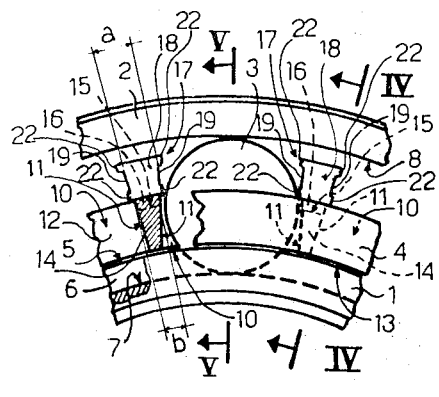
FIG. 3 shows a side view, partly in section, of a part of the bearing of FIG. 1.
Figure 8:
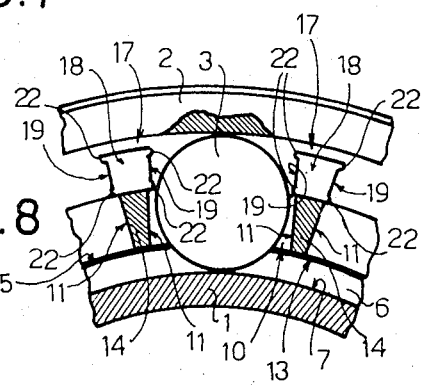
FIGS. 8 and 9 show two side views, partly in section, of a part of the bearing of FIG. 1, illustrating the relative position taken by the parts of the bearing when the latter is assembled and when the outer race has been removed therefrom, respectively.

When the bearing provided with the cage referred to herein is assembled and each roller 3 (FIGS. 3 and 8) rests upon the rolling tracks 7 and 8, due to the clearance between the side surfaces 11 of each housing 10 and the side surface of the corresponding roller 3, the latter can rest upon one of these surfaces without, however, coming into contact with the projecting portion 22 of one of the two members 17 adjacent thereto. In FIGS. 3 and 8, said roller is shown exactly at the center of the associated housing 10.

Figure 9:
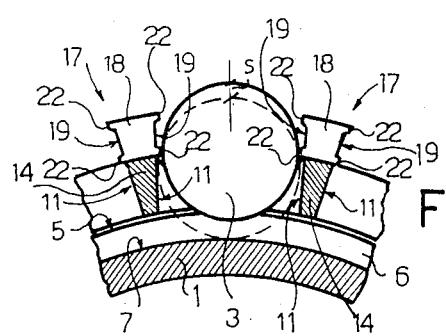

When the outer race 2 is removed, then the rollers 3, no longer resting upon the track 8 of said race, are free to move radially outwards, as shown in FIG. 9. Each roller 3, after a displacement $s$ in said direction, will abut, with its outer surface, against the projecting portions 22 of the adjacent members 17, which will prevent any further displacement of the rollers. The value of $s$ can be chosen small enough so as to make easier the subsequent assembling of the outer race 2 on the remainder of the bearing (such as shown in FIG. 9). In fact, it will be apparent that, if the displacement $s$ is smaller than the height of each chamfer 9 (FIG. 4), as measured perpendicularly to the axis of the bearing, it is possible to mount the outer race 2 on the remaining part of the bearing by means of an axial push exerted upon said race disposed coaxially with said part.

It is therefore evident that one first action exerted by the members 17 is that of preventing the free fall of the rolling bodies when the outer race is removed from the remainder of the bearing and, at the same time, to make easier the subsequent assembling of said race.

The spacer cage of the present invention is able to exert not only the action thus described, but also that of holding the rollers 3 stationary in a radially outer position in which they will not interfere with the shoulders 6 (FIG. 4) when the cage 4 is removed from the inner race 1.

Figure 10:
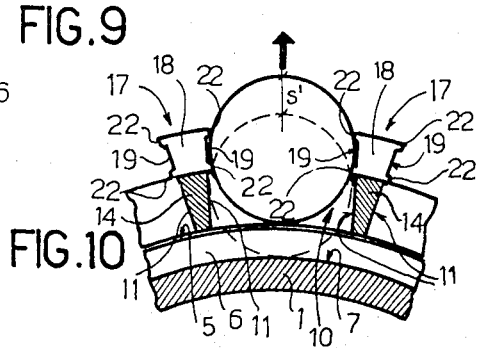
FIG. 10 shows the part of the bearing of FIG. 9, illustrating the position taken by a rolling body when it is pushed outwardly in a radial direction from the position it had in the preceding figure.

If, besides disassembling the race 2, it is desired to remove the inner race 1 from the assembly comprising the spacer cage 4 and the rollers 3, without the latter abandoning said cage, it will be then simply necessary to further radially displace each roller outwardly. At the end of a displacement $s'$ (FIG. 10) starting from the position shown in FIG. 9, during which the projecting portions 22 of the members 17 adjacent to the roller 3 have been elastically deformed, said roller will come between the pair of surfaces 19 (FIG. 10) of the aforementioned members. These surfaces, together with the corresponding projecting portions 22, realize a seat adapted to hold said roller in position after it has deformed, in the manner set forth above, the adjacent projecting portions 22, whose distance is less than the diameter of the roller.

The displacement $s'$ is selected to be at least equal to the height of the annular projections 5 (FIG. 16) of the inner race 1, so as to make it possible — when all the rollers are between the corresponding surfaces 19 of the members 17 — to remove the inner race 1 from the assembly comprising the cage 4 and the rollers 3, by simply pushing said race in the direction of the axis of the bearing.

It will be apparent that, in order to bring the rollers 3 back to their original position, it is sufficient to exert thereon radial forces directed towards the axis of the bearing, so as to elastically deform the projecting portions 22.

Even though the embodiment just described relates to roller bearings wherein the inner race is provided with shoulders 6, the present invention can be applied likewise to bearings in which such shoulders are provided in the outher race. In this instance, the members 17 are secured to grooves provided in the radially innermost portion of the cage 4, with modalities quite similar to those already described with reference to the bearing illustrated herein. It is further evident that the members 17 can be utilized in other rolling bearings, wherein the rolling bodies are not constituted by rollers. In this instance, the shape of the side surfaces 19 (FIG. 6) is such as to prevent any displacement of the rolling bodies after a first displacement equal at least to $s$ (of a value such as to allow assembling of the outer race 2 on the remaining part of the bearing when the bodies are displaced by said quantity) and to constitute seats for locking said bodies upon a displacement $s'$ (i.e., of a value at least equal to that required for allowing removal of the other race of the bearing from the assembly comprising the cage 4 and the rollers 3). Moreover, the cage described can also be utilized in bearings lacking of one or both races, that is to say bearings whose rolling tracks are provided directly on parts of the members on which the bearing must be mounted.

Obviously, many modifications and variations can be introduced in the embodiment of the present invention described above, concerning both the shape and the arrangement of the various parts and components, without departing from the scope of the invention.

What we claim is:

1. Spacer cage of annular shape for a rolling bearing, which has an inner and an outer race between which a crown of rolling bodies is disposed, these bodies being spaced apart by said cage, on both sides of at least one of said races a shoulder for said bodies being provided, comprising:
   a number of housings for said bodies, separated by means of crosspieces;
   means which arrest in one first position each rolling body when this is radially displaced outwardly or inwardly under the action of its own weight, and which hold in a second position each of said bodies when the body is radially displaced outwardly or inwardly, from the position occupied by the same between said races, by a quantity at least equal to the radial height of said shoulders;
   the passage from the first to the second position taking place by applying a radial force of a predetermined value to each rolling body.

2. The spacer cage of claim 1, wherein said means comprise deformable projecting portions, arranged for arresting each of said bodies in said first position, and seats for holding the same bodies in said second position, said projecting portions and seats being integral with said crosspieces of the cage, and the passage from the first to the second position taking place upon deformation of said projecting portions.

3. The spacer cage of claim 2, wherein each crosspiece is integral with a pair of said projecting portions and a pair of said seats, each of said projecting portions and seats facing towards a corresponding housing of the cage.

4. The spacer cage of claim 2, comprising a plurality of members, each of which is provided with said projecting portions and seats and it is secured to a corresponding crosspiece.

5. The spacer cage of claim 4, wherein each of said members comprises an appendage adapted to be inserted in a corresponding cavity provided in a crosspiece for fastening said member to said crosspiece.

6. The spacer cage of claim 5, wherein said appendage and said cavity comprise undercuts apt to prevent said member from being separated from the corresponding crosspiece when the appendage is inserted in the cavity associated therewith.

7. The spacer cage of claim 6, wherein said cavity is a dovetail-shaped groove and said appendage is also dovetail-shaped.

8. The spacer cage of claim 4, having rollers in said housings, wherein the width of the face of each of said members, which is in contact with the corresponding crosspiece, is greater than the width of the radially outer or the radially inner surface of said crosspiece, so that said face of each member will form a step with respect to each side surface of the corresponding crosspiece.

9. The spacer cage of claim 4, wherein each of said members comprises a pair of side surfaces, each of which is shaped so as to form, together with the side surface of the adjacent member and which is facing towards the same, a pair of seats for holding the rolling body situated in the housing comprised between said two members, when said body is radially displaced to said second position.

10. The spacer cage of claim 4, wherein each of said members is made of deformable material.

11. The spacer cage of claim 10, wherein said material is a thermoplastic material.

* * * * *